(12) United States Patent
Weber

(10) Patent No.: US 6,877,771 B2
(45) Date of Patent: Apr. 12, 2005

(54) DUAL FLOW GAS GUIDE APPARATUS AND METHOD

(75) Inventor: Robert B. Weber, Windsor (CA)

(73) Assignee: Autoliv ASP, Inc., Ogden, UT (US)

( * ) Notice: Subject to any disclaimer, the term of this patent is extended or adjusted under 35 U.S.C. 154(b) by 150 days.

(21) Appl. No.: 10/318,853

(22) Filed: Dec. 13, 2002

(65) Prior Publication Data
US 2004/0113400 A1 Jun. 17, 2004

(51) Int. Cl.⁷ .............................................. B60R 21/26
(52) U.S. Cl. .................................. 280/742; 280/730.2
(58) Field of Search ................................ 280/742, 736, 280/730.2, 740

(56) References Cited

U.S. PATENT DOCUMENTS

| | | | | |
|---|---|---|---|---|
| 5,316,336 A | * | 5/1994 | Taguchi et al. | 280/730.2 |
| 5,788,270 A | | 8/1998 | HÅland et al. | 280/729 |
| 6,073,961 A | * | 6/2000 | Bailey et al. | 280/730.2 |
| 6,164,688 A | | 12/2000 | Einsiedel et al. | 280/730.2 |
| 6,199,898 B1 | | 3/2001 | Masuda et al. | 280/730.2 |
| 6,276,712 B1 | * | 8/2001 | Welch et al. | 280/730.2 |
| 6,293,581 B1 | * | 9/2001 | Saita et al. | 280/730.2 |
| 6,296,274 B1 | | 10/2001 | Stevens et al. | 280/741 |
| 6,325,409 B1 | | 12/2001 | Fischer | 280/730.2 |
| 6,364,350 B2 | * | 4/2002 | Hoagland | 280/730.2 |
| 6,378,895 B1 | * | 4/2002 | Brucker et al. | 280/730.2 |
| 6,412,810 B1 | * | 7/2002 | Wipasuramonton et al. | 280/730.2 |
| 6,543,804 B2 | * | 4/2003 | Fischer | 280/730.2 |
| 6,601,871 B2 | * | 8/2003 | Fischer | 280/730.2 |
| 6,695,342 B2 | * | 2/2004 | Tanase et al. | 280/730.2 |
| 6,705,636 B2 | * | 3/2004 | Takahara | 280/728.2 |
| 6,729,645 B2 | * | 5/2004 | Amamori | 280/730.2 |
| 2003/0090095 A1 | * | 5/2003 | Takahara | 280/740 |

FOREIGN PATENT DOCUMENTS

| | | | | |
|---|---|---|---|---|
| DE | 29813636 | | 7/1998 | ........... B60R/21/16 |
| DE | 199 26 076 | | 12/1999 | |
| DE | 101 38 546 | | 3/2002 | |
| DE | 102 11 061 | A1 * | 10/2002 | |
| EP | 945313 | | 3/1999 | ........... B60R/21/22 |
| EP | 808257 | | 5/2000 | ........... B60R/21/22 |
| GB | 2 355 052 | | 4/2001 | |
| JP | 2000-127885 | * | 10/1998 | |
| JP | 2002 337646 | | 11/2002 | |

* cited by examiner

Primary Examiner—David R. Dunn
(74) Attorney, Agent, or Firm—Sally J. Brown

(57) ABSTRACT

The present invention relates to a gas guide for distributing inflation gas into a cushion for an airbag module such as an inflatable curtain module. The gas guide has a first end connected to an inflator, a second end disposed within the cushion, and an intermediate portion between the first and second ends. The second end has a second opening and the intermediate portion has an intermediate opening. The intermediate portion has a small radius bend proximate the intermediate opening such that first and second portions of the inflation gas leave the second opening and the intermediate opening, respectively, to inflate different portions of the cushion. The second end may be constricted such that back pressure in the intermediate portion urges the second portion through the intermediate opening. In addition or in the alternative, a deflector may be used to channel the second portion through the intermediate opening.

37 Claims, 7 Drawing Sheets

DUAL FLOW GAS GUIDE APPARATUS AND METHOD

BACKGROUND OF THE INVENTION

1. Field of the Invention

The present invention relates to systems and methods for protecting vehicle occupants from injury. More specifically, the present invention relates to a gas guide designed to provide multiple gas flows into an airbag cushion along a variety of relative directions.

2. Description of Related Art

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the ignition of an explosive charge. Expanding gases from the charge fill the airbags, which immediately inflate in front of the driver and passenger to protect them from impact against the windshield. Side impact airbags, known as inflatable curtains, have also been developed in response to the need for similar protection from impacts in a lateral direction, or against the side of the vehicle.

In a cushion of any airbag type, it is generally desirable to control the distribution of inflation gases within the cushion during inflation. In some cushion configurations, an even distribution of inflation gas provides even and uniform inflation. In other configurations, an uneven distribution may be desirable. Tubes known as "gas guides" are sometimes used to convey inflation gas from the inflator into the cushion to achieve the desired distribution.

Unfortunately, such gas guides often form a large part of the cost of the airbag module. This is due to the fact that many gas guides require a number of parts that must be assembled prior to inclusion of the gas guide in the airbag module. Assembly of the gas guide is a significant expense especially when the gas guide is used to provide multiple gas flows within the cushion.

Furthermore, many known gas guides cannot be adapted to vary the direction in which inflation gases enter the cushion. Hence, such gas guides may only be usable with a comparatively small number of cushions. Cushions that require a different distribution of inflation gas must then have some other type of gas distribution structure.

Accordingly, a need exists for an apparatus and method for distributing inflation gases in an inflatable cushion. A need further exists for such an apparatus and method that can be utilized with a minimum number of parts that require a comparatively small amount of time and resources to assemble to reduce the overall cost of the airbag module. Furthermore, a need exists for such an apparatus and method that is adaptable to suit multiple cushion types and inflation gas distribution schemes.

SUMMARY OF THE INVENTION

The apparatus and method of the present invention have been developed in response to the present state of the art, and in particular, in response to the problems and needs in the art that have not yet been fully solved by currently available airbag gas distribution systems and methods. Thus, it is an overall purpose of the present invention to provide an apparatus and method for distributing inflation gas within an airbag cushion in a manner that limits the cost of the airbag module and permits adaptation for multiple cushion types and inflation gas distribution schemes.

According to one embodiment, an inflatable curtain module, or IC module, according to the present invention has an inflatable cushion configured to activate to shield a vehicle occupant from impact against a lateral surface of the vehicle, such as a door or window. The cushion preferably has at least one protection zone, and may optionally have multiple protection zones, each of which may serve to protect one occupant. Thus, a single cushion may, for example, cover a rear door or surface as well as a front door, so that an occupant of a back seat can be protected as well as an occupant of a front seat. The protection zones may be connected by a central tether configured to convey tension and inflation gas between the protection zones.

The cushion may have a first membrane and a second membrane, each of which has an interior portion and an outer edge substantially surrounding the interior portion. The first and second membranes may be attached at the outer edges such that the interior portions face each other to form the one or more protection zones of the cushion. Each protection zone may be divided into a number of chambers, which may, for example, be oriented substantially upright.

The membranes may be attached in a number of different ways, including sewing, weaving (such as one piece weaving, also known as OPW), RF welding, chemical or adhesive bonding, or the like. The chambers may be separated from each other through the use of a similar method, or through the use of an entirely different attachment process.

The IC module also has an inflator connected to the cushion via a gas guide designed to convey inflation gas from the inflator into the cushion. The gas guide may be constructed of a rigid material such as a metal, or alternatively, of a lighter weight material such as a plastic or composite. The gas guide may pass into the cushion via an inflation port of the cushion, and may be configured to distribute inflation gas to both of the protection zones.

The gas guide has a first end connected to the inflator and a second end disposed within the cushion and oriented toward the second protection zone. An intermediate portion is disposed between the first and second ends. The first end has a first opening in communication with the inflator. The second end has a second opening, and the intermediate portion has an intermediate opening. The intermediate opening is positioned proximate a small-radius bend formed in the intermediate portion. A second small-radius bend is disposed outside the cushion so that the cushion and the inflator are generally parallel to each other.

According to other embodiments, the gas guide is bent differently outside the cushion to permit the inflator to be disposed at other locations or orientations. For example, the gas guide may be attached to an inflator disposed laterally, or aligned with the bow of the roof.

The second end has a narrowed portion so that inflation gas flow through the second opening is somewhat restricted, and only a first portion of the inflation gas is able to escape through the second opening. Hence, significant back pressure exists within the intermediate portion, causing a second portion of the inflation gas to exit the gas guide through the intermediate opening.

The intermediate opening is positioned on the curvature of the small-radius bend so that the second portion of the inflation gas flows generally into the first protection zone. The first portion of the inflation gas flows into the second protection zone through a transfer tube that connects the first and second protection zones. The relative sizes of the second opening and the intermediate opening can be tuned to adjust the relative speed with which the first and second protection zones inflate. Furthermore, the second end may be oriented differently and/or the intermediate opening may be positioned differently to adjust the vectors along which inflation gas enters the cushion from the gas guide.

The gas guide may be manufactured by, for example, obtaining a tube of stock material with a desired size. The tube may be cut to the appropriate length, and its diameter may be resized as needed. The tube may be bent to form the small-radius bends, and the second end may be rolled or otherwise tapered to form the narrowed portion. A punching operation may be used to cleanly form the intermediate opening. If desired, the first end may be threaded or otherwise processed to facilitate attachment with the inflator.

According to one alternative embodiment, the second end of the gas guide has a cap in place of the narrowed portion. The second opening is positioned on the cap, and once again provides a flow constriction that creates back pressure within the intermediate portion. The intermediate portion has a small-radius bend with an intermediate opening positioned such that the first and second portions of the inflation gas exit in substantially opposite directions through the second and intermediate openings, respectively. The sizes of the openings may be tuned such that inflation gas flow from the gas guide is substantially thrust neutral.

According to another alternative embodiment, the second end includes no narrowing, cap, or other constricting feature. Rather, the second opening has a cross sectional area, or flow area, that is about the same as that of the intermediate portion. Thus, there may be no significant back pressure within the intermediate portion. Rather, the intermediate portion has an intermediate opening that includes a deflector designed to separate the inflation gas flow through the intermediate portion. Consequently, the first portion of the inflation gas flows onward to the second end and the second portion is diverted to exit through the intermediate opening.

According to another alternative embodiment, the second end is again narrowed to provide back pressure within the intermediate portion. Additionally, the intermediate portion has an intermediate opening that includes a deflector designed to separate the inflation gas into multiple flows. Again, the first portion of the inflation gas flows onward to the second end and the second portion is diverted to exit through the intermediate opening. The second portion is expedited by the back pressure.

According to yet another alternative embodiment, the second end is again narrowed to provide back pressure within the intermediate portion. The intermediate portion has an intermediate opening positioned such that the first and second portions of inflation gas exit in substantially the same direction through the second and intermediate openings, respectively.

Through the system and method of the present invention, the first and second protection zones can be made to inflate relatively uniformly, through the use of a gas guide that is easily manufactured from a small number of parts, possibly even a single part. Furthermore, the directions along which gas enters the cushion may be readily adapted to suit a variety of cushion types and inflation gas distribution schemes. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of presently preferred embodiments of the invention.

The present invention utilizes principles of compressible fluid flow to control the distribution of inflation gases within a cushion. More precisely, a portion of gas may be made to separate from a flow through the use of a flow separator that divides the flow, or through an adjoining region in which the total pressure, or static plus dynamic pressure, is comparatively low. The speed with which a compressible fluid enters a volume increases with the pressure differential tending to push the fluid into the volume as well as the cross sectional area through which the compressible fluid must travel to enter the volume. Thus, multiple gas flows may be provided into a cushion through the use of a single gas distribution structure. The manner in which the above described principles are implemented by the present invention will be described in greater detail with reference to the Figures, as follows.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured unitarily, i.e., as a single piece, without requiring the assembly of multiple pieces. Multiple parts may be integrally formed with each other if they are formed from a single workpiece.

Figure 1:
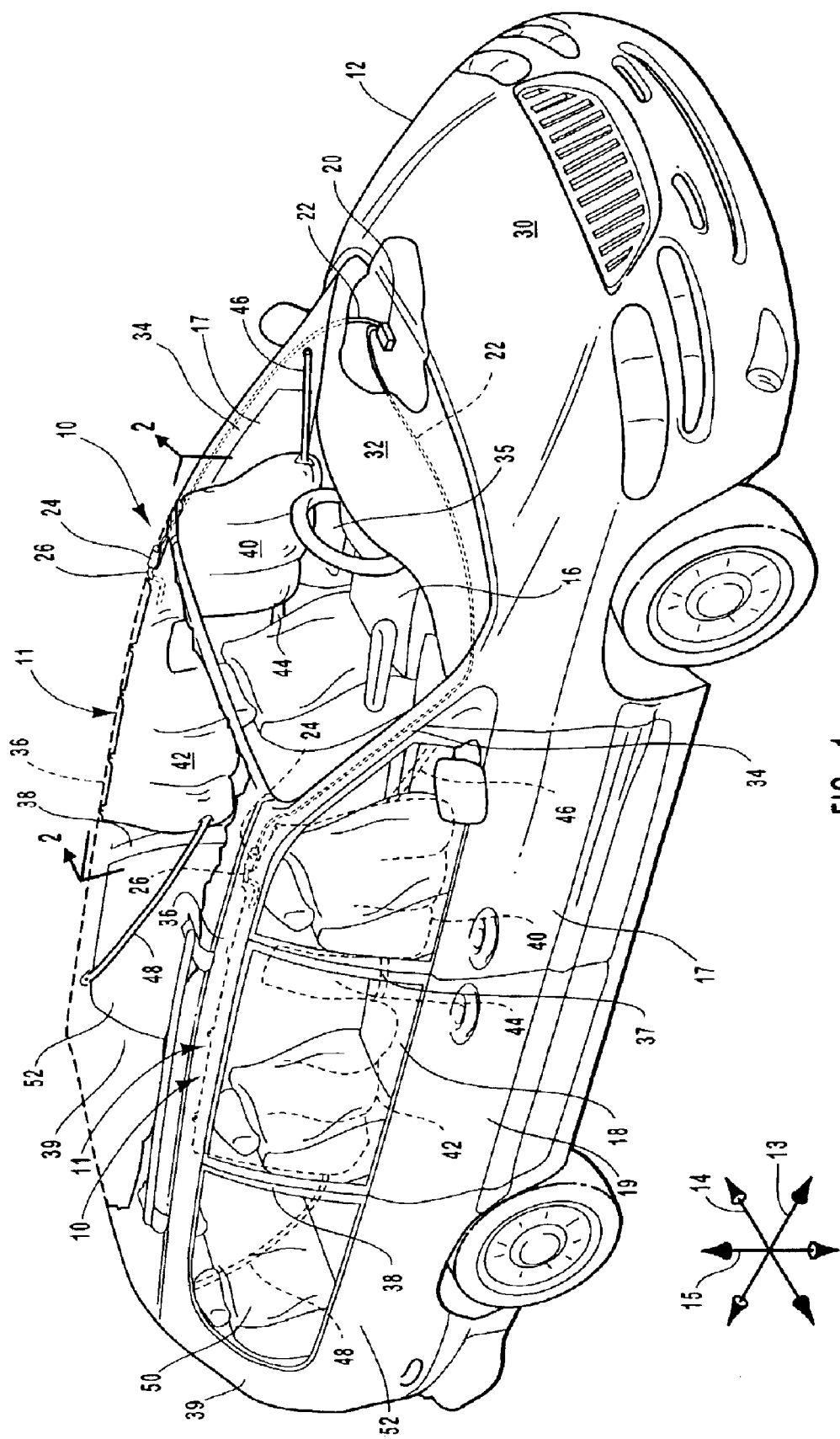
FIG. 1 is a cutaway, perspective view of a vehicle incorporating one embodiment of an inflatable curtain module according to the invention.

Referring to FIG. 1, a perspective view illustrates two inflatable curtain modules 10, or IC modules 10, according to one possible embodiment the invention. Each of the IC modules includes a cushion 11 designed to inflate to protect an occupant of a vehicle 12 in which the IC modules 10 are installed. The IC modules 10 are designed to protect the occupant from lateral impact; however, the present invention applies to other types of airbag systems such as driver's and passenger's side front impact airbags, overhead airbags, and knee bolsters.

The vehicle 12 has a longitudinal direction 13, a lateral direction 14, and a transverse direction 15. The vehicle 12 further has front seats 16 laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted.

One or more accelerometers 20 or other similar impact sensing devices detect sudden lateral acceleration (or deceleration) of the vehicle 12 and transmit electric signals via electric lines 22 to one or more sources of pressurized gas, or inflators 24. An electronic control unit, or ECU (not shown) may also be included to process output from the accelerometers 20 and provide the necessary signals to the inflators 24. FIG. 1 shows separate accelerometers 20, electric lines 22, and inflators 24 attached to each cushion 11. However, if desired, only a single accelerometer 20 need be used. Furthermore, the cushions 11 may both be inflated via a single inflator 24.

Each of the inflators 24 may take the form of a hollow pressure vessel containing a chemically reactive material and/or compressed gas that can be activated or released upon application of electricity to provide an outflow of inflation gases. Each cushion 11 has a gas guide 26 to convey the inflation gases from the associated inflator 24 to the cushion 11. The inflators 24 may operate with such rapidity that, before the vehicle 12 has fully reacted to the impact, the cushions 11 have inflated to protect vehicle occupants from impact.

The accelerometers 20 and inflators 24 may each be stowed proximate their respective cushions 11, as depicted. In the alternative, the accelerometers and/or inflators 24 may be disposed within an engine compartment 30 or dashboard 32 of the vehicle 12. In such a configuration, the electric lines 22 or gas conduits (not shown) may be disposed along A pillars 34 of the vehicle 12 to convey electricity or inflation gas from the vicinity of the dashboard 32 upward, along the windshield 35, to the cushions 11. The inflators 24 and/or accelerometers 20 may also alternatively be disposed on the A pillars. However, in the IC modules 10 of FIG. 1, the accelerometers 20 and inflators 24 are disposed along roof rails 36 of the vehicle 12, above the cushions 11, as depicted.

Each of the cushions 11 is installed along one of the roof rails 36. The cushions 11 shown in FIG. 1 are configured to protect not only occupants of the front seats 16, but those of the rear seats 18 as well. Thus, each cushion 11 may have a first protection zone 40 configured to inflate between the front seats 16 and one of the front doors 17, and a second protection zone 42 configured to inflate between the rear seats 18 and one of the rear doors 19.

The first and second protection zones 40, 42 of each cushion 11 may be attached together through the use of a central tether 44 between the protection zones 40, 42. The central tethers 44 may be longitudinally positioned between the front seats 16 and the rear seats 18; consequently, the central tethers 44 may or may not be configured to provide impact protection for occupants of the vehicle 12. If desired, the central tethers 44 may be replaced by broader fabric sections and/or additional inflatable chambers (not shown).

The first protection zone 40 of each cushion 11 may be attached to the adjoining A pillar 34 via a front tether 46. Similarly, the second protection zone 42 of each cushion 11 may be attached to the rearward portion of the adjoining roof rail 36 via a rear tether 48. The front and rear tethers 46, 48 cooperate with the central tether 44 to provide a tension line across each cushion 11 to keep the cushions 11 in place during inflation and impact.

Although each cushion 11 in FIG. 1 has two protection zones 40, 42, the invention encompasses the use of cushions with any number of protection zones. Thus, if desired, the protection zones 42 and central tethers 44 may be omitted to leave only the protection zones 40. Alternatively, each of the cushions 11 may be extended to have one or more protection zones positioned to protect occupants of extra seats 50 behind the rear seats 18 from impact against third lateral surfaces 52 of the vehicle 12.

The gas guides 26 are designed to distribute inflation gas from the inflators 24 into the cushions 11 in a relatively even manner. Thus, each of the cushions 11 deploys in such a manner that both of the protection zones 40, 42 inflate in a timely fashion. The gas guides 26 have a simplified configuration designed for cost-effectiveness and ease of manufacture. The configuration and operation of the gas guides 26 will be shown and described in greater detail with reference to FIGS. 2 and 3.

Figure 2:
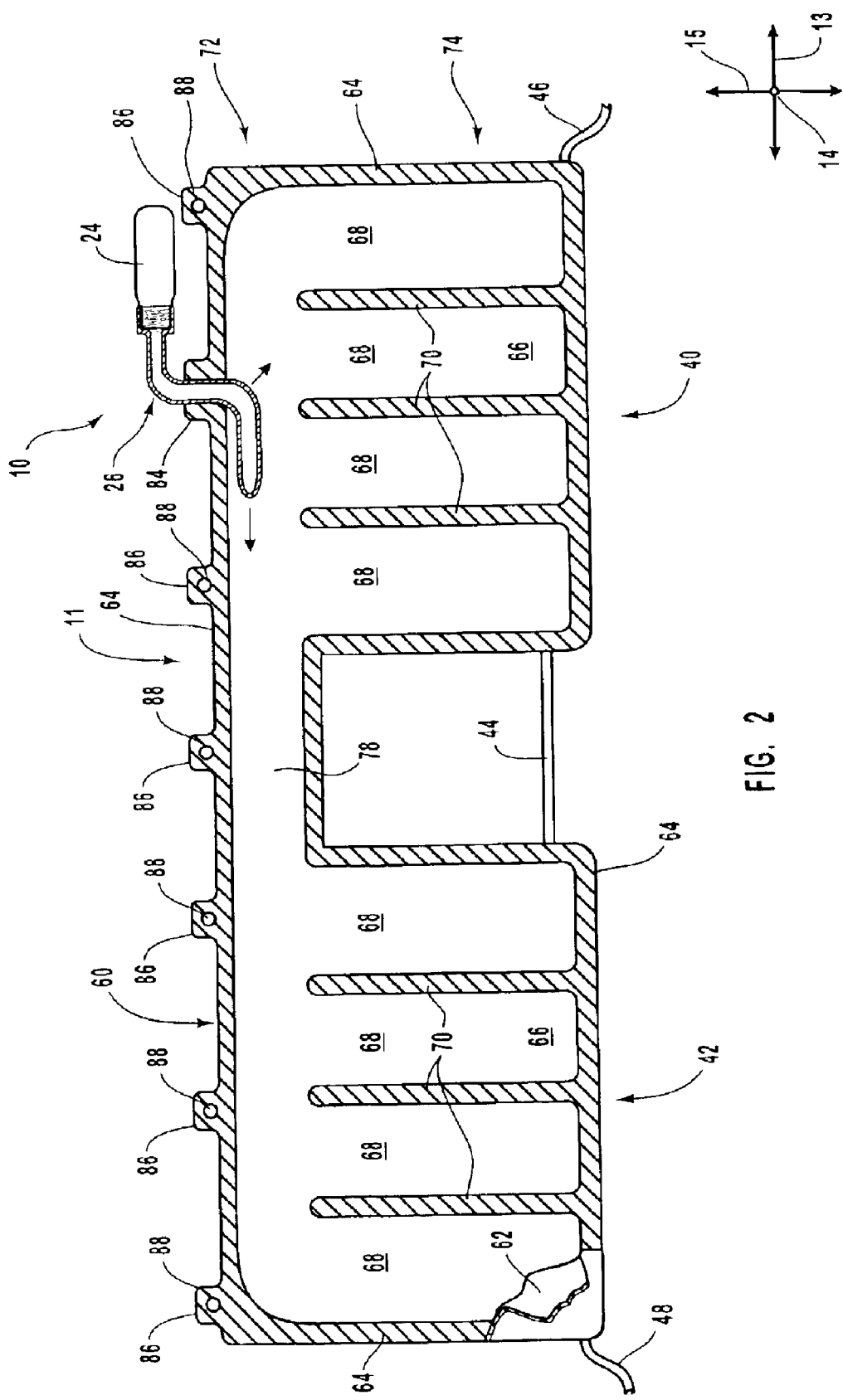
FIG. 2 is a side elevation, section view of the cushion and gas guide of the inflatable curtain module of FIG. 1.

Referring to FIG. 2, a side elevation, section view of one of the cushions 11 of FIG. 1 is depicted. The cushion 11 may be produced using "lay flat" construction, in which the cushion 11 is constructed largely of flat, symmetrical elements affixed together. The cushion 11 may, for example, have a first membrane 60 and a second, similarly shaped membrane 62, only a portion of which is shown in FIG. 2. The first and second membranes 60, 62 may be formed from one or more flexible, substantially gas-impermeable materials such as fabrics. Each of the membranes 60, 62 may have an outer edge 64 extending generally around the perimeter of the membrane 60, 62. The outer edges 64 of the membranes 60, 62 may substantially encircle an interior portion 66 for each of the protection zones 40, 42.

The interior portion 66 of each of the protection zones 40, 42 may be divided into a plurality of chambers 68, each of which is oriented substantially upright. The chambers 68 of each protection zone 40, 42 may be divided from each other through the use of chamber dividers 70, which may take the form of interior seams 70 formed by attaching the first and second membranes 60, 62 together between the chambers 68 through sewing, bonding, RF welding, or the like. Extra fabric seams, polymer coatings, or the like may be used to form the interior seams 70 with the selected attachment method.

As mentioned previously, the cushion 11 may be manufactured through lay flat construction. According to lay flat construction, the first and second membranes 60, 62 may be made separately of a flexible material such as a fabric, and laid together, one on top of the other. In the alternative, the first and second membranes 60, 62 may be portions of a single piece of fabric folded together; the present invention contemplates both unitary and separate membranes 60, 62.

After the membranes 60, 62 have been properly aligned, the outer edges 64 of the first and second membranes 60, 62 may be attached together to effectively enclose the interior portions 66, aside from an opening for incoming inflation gas. The interior portions 66 then form the protection zones 40, 42, which are capable of retaining inflation gas, at least for a period of time sufficient to provide impact protection.

The outer edges 64 may be attached through the use of any attachment mechanism suitable for attaching two flexible portions of material together. For example, mechanical fastening, sewing, weaving, chemical or adhesive bonding, thermal, sonic, or electromagnetic welding, or the like may be used. For example, "one piece woven" technology may be utilized to affix the membranes 60, 62 together through the interweaving of fibers from the membranes 60, 62.

Alternatively, RF welding may be utilized to affix the membranes 60, 62 through the application of radio frequency electromagnetic radiation. RF welding works exceptionally well with urethane-based materials (materials having a significant urethane content); thus, if RF welding is used, the first and second membranes 60, 62 may advantageously be either constructed of or coated with a urethane-based substance.

The cushion 11 has an upper end 72 and a lower end 74. The upper end 72 is designed to be attached to the roof rail 36. The cushion 11 may be compacted by rolling or folding the lower end 72 toward the upper end 72. The first and second protection zones 40, 42 are in fluid communication with each other via a transfer port 78 extending along the upper end 72, between the protection zones 40, 42.

Upon inflation of the cushion 11, the chambers 68 of the protection zones 40, 42 may shorten in the longitudinal direction 13 to decrease the overall longitudinal length of the cushion 11. This longitudinal shortening adds to the tension exerted against the inflated cushion 11 by the front and rear tethers 46, 48. Such tension helps to keep the inflated cushion 11 properly positioned during impact.

The cushion 11 may have an inflation port 84 through which the gas guide 26 passes to convey inflation gas into the cushion 11. The inflation port 84 may be sealed around the gas guide 26 through the use of a metal band or other fitting. In the alternative, the inflator 24 may be disposed partially or entirely within the cushion 11 so that the gas guide 26 is entirely within the cushion 11 and no inflation port 84 is required.

Furthermore, the cushion 11 may have a number of tabs 86 that facilitate installation of the cushion 11 in the vehicle 12. Each of the tabs 86 may have a hole 88 so that fasteners such as bolts, nuts, rivets, flexible plastic parts, or the like can be used to affix the tabs 86 to the roof rail 36.

As depicted, the gas guide 26 is positioned generally over and within the first protection zone 40. However, the gas guide 26 may be disposed at a wide variety of positions with respect to the cushion. As mentioned previously, the gas guide 26 is designed to convey inflation gas from the inflator 24 into the first and second protection zones 40, 42. The manner in which this is carried out will be described in greater detail in connection with FIG. 3.

Figure 3:
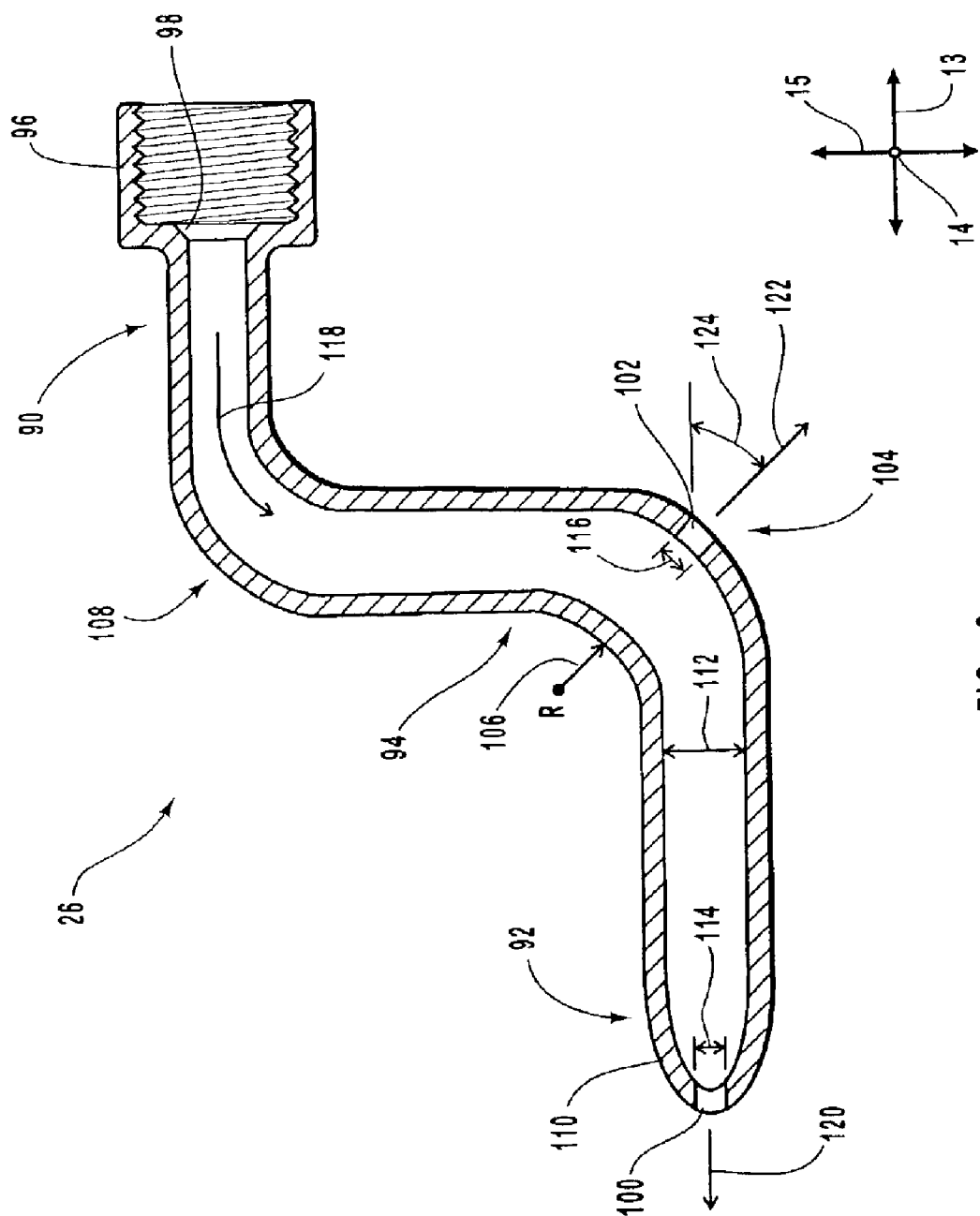
FIG. 3 is a side elevation, section view of the gas guide of the inflatable curtain module of FIG. 1.

Referring to FIG. 3, a side elevation, section view depicts the gas guide 26 in isolation. The gas guide 26 is formed of a stiff material such as a metal, sturdy plastic, or a composite material. For example, the gas guide 26 may be made of steel.

The gas guide 26 has a first end 90 connected to the inflator 24 and a second end 92 disposed within the cushion 11. An intermediate portion 94 extends from the first end 90 to the second end 92. The first end 90 may optionally have an inflator attachment fitting 96, which may be threaded or otherwise structured to form a gastight seal with the inflator 24. Alternatively, the first end 90 may be attached to the inflator 24 through the use of one or more fittings separate from the gas guide 26.

The first end 90 has a first opening 98 that receives inflation gas from the inflator 24. Similarly, the second end 92 has a second opening 100 disposed within the cushion 11. The second end 92 is oriented such that inflation gas exiting the second opening 100 is ejected toward the transfer port 78 and the second protection zone 42. Additionally, the intermediate portion 94 has an intermediate opening 102, which is disposed on a first small-radius bend 104 of the intermediate portion 94.

The first small-radius bend 104 has a radius 106, defined as the distance between the interior wall of the curve (the upper wall of the first small-radius bend 104 depicted in FIG. 3) and the center of the curve of the interior wall. The radius 106 may range from about zero inches to about four inches. Furthermore, the radius 106 may range from about one-quarter inch to about two inches. Yet further, the radius 106 may range from about one-half inch to about one inch.

The first small-radius bend 104 may be a substantially perpendicular bend, as depicted in FIG. 3. "Substantially perpendicular" refers to a bend that forms an angle near 90°. This angle of the first small-radius bend 104 is the arc through which the first small-radius bend 104 moves, bounded by any adjoining straight sections or inflection points. According to one configuration, the angle of the first small-radius bend 104 ranges from about 60° to about 120°. Furthermore, the angle may range from about 75° to about 105°. Yet further, the angle may be close enough to 90° as to be visually indistinguishable from perpendicularity.

A second small-radius bend 108 is disposed outside the cushion 11, and is oriented such that the inflator 24 can be oriented along the longitudinal direction 13, generally parallel to the cushion 11. The second small-radius bend 108 may have a wide variety of configurations, or may even be omitted entirely, depending on the position of the inflator 24.

As shown, the intermediate opening 102 is positioned on the first small-radius bend 104. In alternative configurations, the intermediate opening 102 may be displaced somewhat from the first small-radius bend 104. In either case, the intermediate opening 102 is positioned proximate the first small-radius bend 104. The positioning of the intermediate opening 102 with respect to the first small-radius bend 104 helps determine the direction in which inflation gas exits the gas guide 26 through the intermediate opening 102.

The second end 92 has a narrowed portion 110 that provides a decrease in the interior diameter of the gas guide 26. The intermediate portion 94 has an inside diameter 112, which provides an airflow area, or cross sectional area, through which inflation gas travels during inflation. The second opening 100 has a diameter 114 smaller than the inside diameter 112. Therefore, the second opening 100 provides a smaller cross sectional area than the intermediate portion 94. The second opening 100 is a flow restrictor, and a pressure gradient will exist across the second opening 100 during inflation.

This pressure gradient exists because there is "back pressure" within the intermediate portion 94, or a higher pressure than the pressure outside the wall of the intermediate portion 94. Such back pressure is necessary because dynamic pressure, or the pressure gradient between fluids moving at different velocities, will tend to urge gas into the intermediate portion 94 through the intermediate opening 102. The relatively rapidly moving gas within the intermediate portion 94 provides a vacuum effect in relation to the slower gas outside the gas guide 26. The creation of back pressure via the geometries of the narrowed portion 110 and the second opening 100 overcomes this dynamic pressure gradient to force inflation gas to exit the intermediate portion 94 via the intermediate opening 102.

Consequently, upon deployment of the inflator 24, inflation gas, represented by an arrow 118, leaves the inflator 24 and enters the first end 90 via the first opening 98. The inflation gas moves through the intermediate portion 94, and a first portion of the inflation gas, represented by an arrow 120, moves into the second end 92 and leaves the second portion 92 through the second opening 100. A second portion of the inflation gas, represented by an arrow 122, separates from the first portion and leaves the intermediate portion 94 of the gas guide 26 via the intermediate opening 102.

As shown, the first portion exits the second end 92 along a direction generally parallel to the second end 92 and the adjacent region of the intermediate portion 94. Thus, the first portion flows generally into the transfer port 78 of FIG. 2 to inflate the second protection zone 42. The second portion exits the intermediate opening 102 at an angle 124 with respect to a direction opposite to the direction in which the first portion exits the second end 92. The angle 124 is selected to provide relatively rapid and even inflation of the first protection zone 40 via the second portion of the inflation gas from the inflator 24.

The angle 124 is determined, at least in part, by the position of the intermediate opening 102 with respect to the first small-radius bend 104. The intermediate opening 102 may be positioned higher on the first small-radius bend 104 or upstream of the first small-radius bend 104 to decrease the angle 124. Alternatively, the intermediate opening 102 may be positioned lower on the first small-radius bend 104 or downstream of the first small-radius bend 104 to increase the angle 124.

With a smaller angle 124, the gas guide 126 may be positioned nearer the second protection zone 42, such as within the transfer port 78. With a larger angle 124, the gas guide 126 may be positioned further toward the forward edge of the first protection zone 40. Thus, the position of the intermediate opening 102 may be adjusted to tune the direction in which the second portion of the inflation gas exits the gas guide 26, thereby permitting easy adaptation of the design of the gas guide 26 to suit multiple cushion types and inflation gas distribution schemes.

According to selected embodiments, the angle 124 ranges from about 0° to about 90°. Furthermore, the angle 124 may range from about 15° to about 75°. Yet further, the angle 124 may range from about 30° to about 60°. Still further, the angle 124 may be about 45°. In alternative embodiments, the angle 124 may even be negative, such that the second portion of the inflation gas flows in an upward direction with respect to the first portion.

If desired, the gas guide 26 may be used to inflate two cushions that are not in fluid communication with each other. For example, one cushion (not shown) may have an inflation port sealed around the second end 92, while a second cushion (not shown) has an inflation port sealed around the intermediate opening 102. Furthermore, the gas guide 26 may have additional openings used to provide more uniform inflation or to inflate a larger number of protection zones or individual cushions.

The gas guide 26 also need not be oriented or shaped as shown. For example, the gas guide 26 may have a non-circular cross section, a variety of bending schemes, or the like. If desired, the gas guide 26 may be oriented to reverse the inflation roles of the second opening 100 and the intermediate opening 102. For example, the second end 92 may be disposed within one protection zone while the intermediate opening 102 is positioned to eject the second portion into an adjoining protection zone.

Furthermore, the gas guide 26 is not limited to use with inflatable curtain modules. The gas guide 26 may be used to provide cost-effective and relatively uniform inflation of other types of airbags such as driver's and passenger's side frontal impact airbags, overhead airbags, knee bolsters, and the like. Such configurations are not shown, but may be readily envisioned by one of skill in the art with the aid of this disclosure.

The gas guide 26 may be manufactured according to a number of different methods. According to one manufacturing method, a piece of stock steel tubing is first provided. If desired, the tube may be trimmed to the appropriate length and expanded or contracted to provide the desired inside diameter. The tube may be mechanically bent to form the first and second small-radius bends 104, 108 through the use of a press, bending machine, or some other device. The narrowed portion 110 of the second end 92 may be formed through the use of a rolling operation or the like, so that the second opening 100 obtains the desired size.

The first end 90 may optionally be tapped and/or enlarged to provide the inflator attachment fitting 96. In the alternative, as mentioned previously, the first end 90 need not have any inflator attachment feature. The first end 90 may instead be attached to the inflator 24 via one or more fittings on the inflator 24 or separate fittings.

The intermediate opening 102 may be formed in a variety of ways. For example, a punching operation may be used to remove a section of the wall of the intermediate portion 94 to provide the intermediate opening 102. Punching may advantageously provide a relatively clean hole, without edges that extend into the intermediate portion 94. Thus, the intermediate opening 102 may be configured to operate substantially independently of any obstruction within the intermediate portion. Other methods such as piercing may alternatively be used to form the intermediate opening 102. Such methods may provide a hole that is not as "clean," but still provides the necessary gas flow characteristics.

The completed gas guide 26 may then be inserted into the inflation port 84 until the inflation port 84 is disposed between the first and second small-radius bends 104, 108. Alternatively, the gas guide 26 may be laid in place between the first and second membranes 60, 62 prior to attachment of the outer edges 64 of the membranes 60, 62 to each other. The gas guide 26 may be positioned at the future location of the inflation port 84, and the membranes 60, 62 may be attached together to capture the gas guide 26. As mentioned previously, a metal band or the like may be used to seal the opening between the intermediate portion 94 and the inflation port 84.

Advantageously, the gas guide 26 is constructed of only one piece of material. Multiple metal tubes need not be attached together. The manufacturing steps used are relatively simple and easily automated. Thus, the gas guide 26 represents significant cost savings for the airbag module 10 as a whole.

Figure 4:
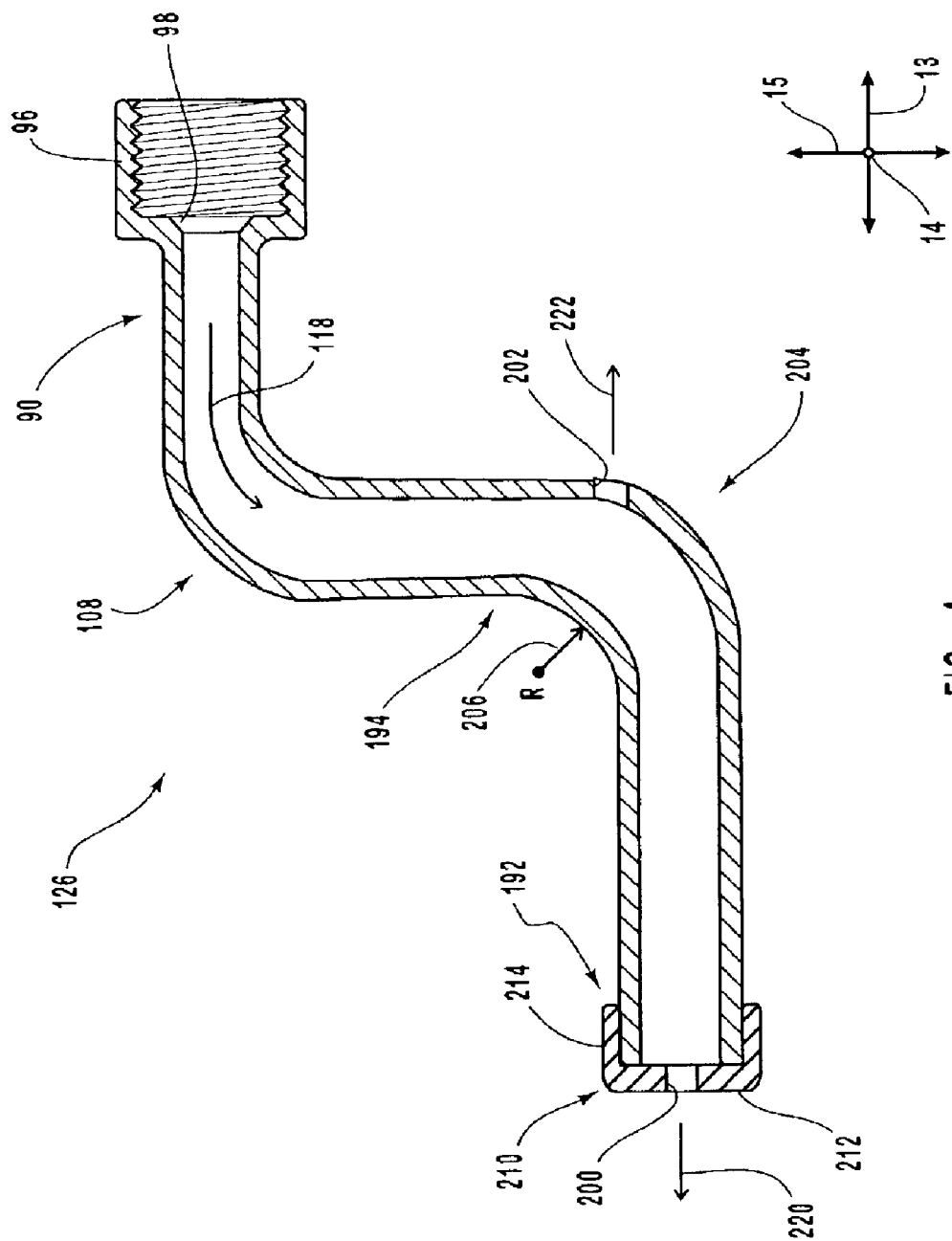
FIG. 4 is a side elevation, section view of a gas guide according to an alternative embodiment of the invention.

Referring to FIG. 4, a side elevation, section view depicts a gas guide 126 according to an alternative embodiment of the invention. The gas guide 126 has a configuration somewhat similar to the gas guide 26 of the previous embodiment. The gas guide 126 has a first end 90 configured to be attached to an inflator, a second end 192, and an intermediate portion 194 between the first and second ends 90, 192. The first end 90 has an inflator attachment fitting 96 and a first opening 98 that receives the inflation gas from the inflator 24.

The second end 192 has a second opening 200 with a cross sectional area smaller than that of the intermediate portion 194. The intermediate portion 194 has an intermediate opening 202 positioned proximate a first small-radius bend 204. The first small-radius bend 204 has a radius 206. The intermediate portion 194 also has a second small-radius bend 208 disposed upstream of the first small-radius bend 204.

The second end 192 has no narrowed portion. Rather, the second end 192 has a cap 210 with a face 212, in which the second opening 200 is disposed, and a skirt 214 encircling the remainder of the gas guide 26. The skirt 214 may be attached to the remainder of the gas guide 26 via welding, interference fitting, adhesive or chemical bonding, mechanical fastening, or the like. The cap 210 enables the second opening 200 to have a smaller cross sectional area than that of the intermediate portion 194 without requiring a change in the diameter of the tube from which the remainder of the gas guide 26 is formed.

The narrowed portion 110 and the cap 210 are simply two examples of mechanisms that may be used to decrease the cross sectional area of a terminal opening. Other methods, such as partial plugging, crimping, and the like, may also be used as alternatives to those depicted in FIGS. 3 and 4.

Like the second opening 100 of the previous embodiment, the second opening 200 provides a flow restriction to create back pressure within the intermediate portion 194. Thus, a pressure gradient will force inflation gas to exit the gas guide 26 via the intermediate opening 202. More precisely, inflation gas, represented by an arrow 118, exits the inflator 24 when the inflator 24 deploys, and enters the gas guide 26 via the first opening 98. A first portion of the inflation gas, represented by an arrow 220, moves through the intermediate portion 194 to exit the gas guide 26 through the second opening 200. A second portion of the inflation gas, represented by an arrow 222, exits the intermediate portion 194 via the intermediate opening 202.

As shown, the intermediate opening 202 is positioned to face in a direction generally parallel to the direction in which the first portion of the inflation gas exits the second opening 200. Thus, the second portion of the inflation gas exits the intermediate opening 202 in a direction generally opposite to the direction taken by the first portion. Consequently, no angle is depicted between the arrows 220 and 222 because such an angle would be approximately zero. Such a configuration may be used, for example, if the gas guide 126 is to be positioned between two protection zones, rather than partially within one of the protection zones, as depicted in FIG. 2.

In this application, "generally opposite" refers to directions that are close enough to being opposite to each other that the inflation of the cushion does not differ significantly from the inflation that would be provided by exactly opposing flows. Hence, portions of inflation gas that flow in directions generally opposite to each other may be offset from a perfect parallel disposition by some small angle. Advantageously, the thrust produced by flows of air in generally opposite directions will be mutually negating. Consequently, the attachment of the gas guide 26 to the vehicle 12 may be simplified by the need to bear a comparatively low thrust upon inflation.

Figure 5:
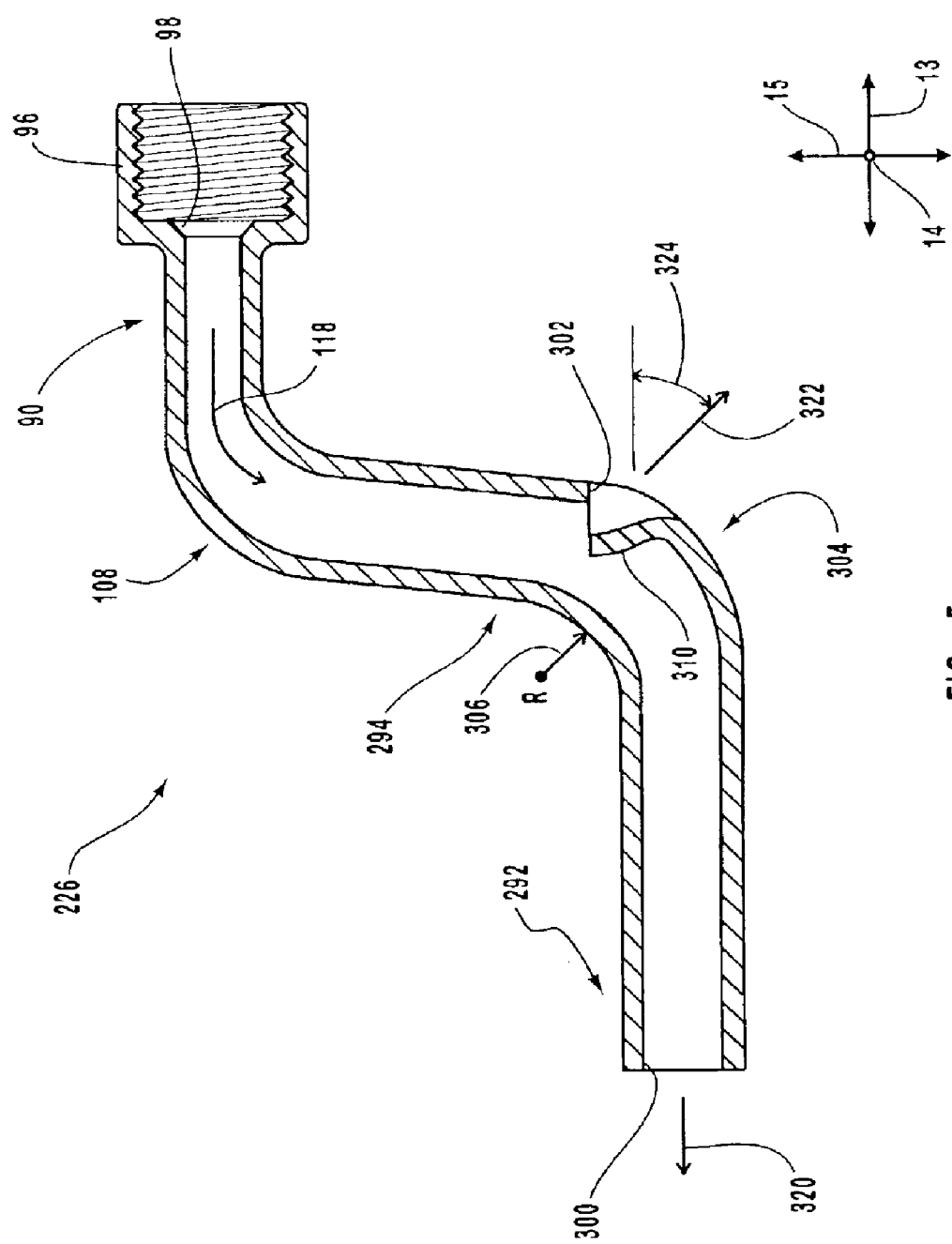
FIG. 5 is side elevation, section view of a gas guide according to another alternative embodiment of the invention.

Referring to FIG. 5, a side elevation, section view depicts a gas guide 226 according to another alternative embodiment of the invention. Like the gas guides 26, 126 of the previous embodiments, the gas guide 226 has a first end 90, a second end 292, and an intermediate portion 294 extending from the first end 90 to the second end 292. The first end 90 has an optional inflator attachment fitting 96 designed to be attached to an inflator and a first opening 98 that receives inflation gas from the inflator upon deployment.

The second end 292 of the gas guide 226 has a second opening 300, which has a cross sectional area that is generally the same as that of the intermediate portion 294. No narrowing or cap is included. The intermediate portion 294 has an intermediate opening 302 disposed on a first small-radius bend 304, which has a radius 306. The intermediate portion 294 also has a second small-radius bend 108.

As mentioned previously, the second opening 300 has a cross sectional area generally equal to that of the intermediate portion 294. Thus, no extra manufacturing processes are required to narrow the diameter of the second opening 300. However, the second opening 300 does not provide a significant flow restriction, and therefore, does not contribute to back pressure. Hence, a different mechanism may be used to channel inflation gas from the intermediate portion 294 through the intermediate opening 302.

More specifically, the intermediate portion 294 has a deflector 310, which may simply be a portion of the wall of the intermediate portion 294 that has been severed and bent inward to form the intermediate opening 302. The intermediate portion 294 has a generally scoop-like shape so that separates the inflation gas into multiple flows.

Thus, upon deployment of the inflator 24, inflation gas, represented by an arrow 118, enters the gas guide 226 via the first opening 98. A first portion of the inflation gas, represented by an arrow 320, moves past the deflector 310 and through the intermediate portion 294 to exit the gas guide 226 via the second opening 300. A second portion of the inflation gas, represented by an arrow 322, is deflected by the deflector 310 and is forced to follow the pathway defined by the deflector 310. This pathway leads to the intermediate opening 302, through which the second portion exits the gas guide 226.

The second portion may exit along a direction displaced by an angle 324 from a direction opposite to the direction in which the first portion leaves the second opening 300. The angle 324 is influenced by the position of the intermediate opening 302 and the deflector 310 with respect to the first small-radius bend 304. Additionally, the angle 324 is influenced by the shape of the deflector 310. For example, the amount of curvature of the deflector 310 affects the path along which the deflector 310 channels the second portion. Hence, a greater curvature of the deflector 310 may result in a smaller angle 324, and a lesser curvature may increase the angle 324.

The methods and apparatus of the present invention enable the effective distribution of inflation gas into a cushion of an airbag module. Such gas distribution can be obtained at a low cost, with a relatively rapid and simple manufacturing/assembly process. Furthermore, the methods and apparatus of the present invention are readily adaptable to provide inflation gas flows in different directions to suit the requirements of various cushion types and inflation gas distribution schemes.

Figure 6:
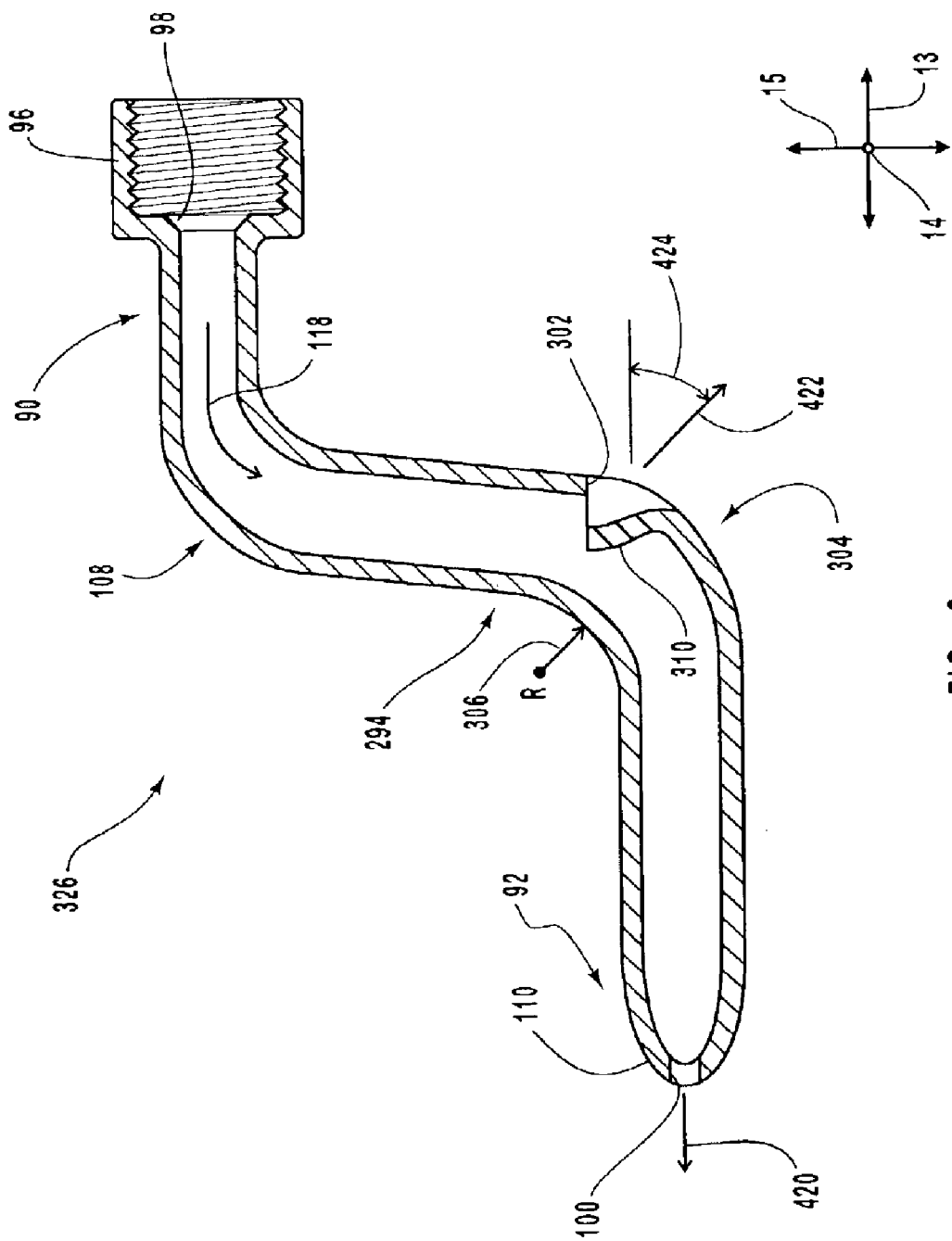
FIG. 6 is a side elevation, section view of a gas guide according to another alternative embodiment of the invention.

Referring to FIG. 6, a side elevation, section view depicts a gas guide 326 according to another alternative embodiment of the invention. Like the gas guides 26, 126, 226 of the previous embodiments, the gas guide 326 has a first end 90, a second end 92, and an intermediate portion 294 extending from the first end 90 to the second end 92.

The first and second ends 90, 92 are like those of the gas guide 26 of FIG. 3 and the intermediate portion 294 is like that of the gas guide 226 of FIG. 5. Thus, the gas guide 326 has a narrowed portion 110 as well as a deflector 310. The deflector 310 acts to separate inflation gas from the inflator, depicted by the arrow 118, into a first portion, represented by an arrow 420, and a second portion, represented by an arrow 422. The first portion passes the deflector 310 to reach the second end 92 and exist the gas guide 326 via the second opening 100. The second portion is channeled by the deflector 310 to exit the intermediate portion 294 via the intermediate opening 302. The second portion exits along an angle 424 with respect to the direction in which the first portion exits the second opening 100.

In addition to the action of the deflector 310, the narrowed portion 110 creates back pressure within the intermediate portion 294. The back pressure helps expedite ejection of the second portion from the intermediate opening 302. Thus, the combined effects of the deflector 310 and the narrowed portion 110 are used to obtain the gas flow characteristics of the gas guide 326.

Figure 7:
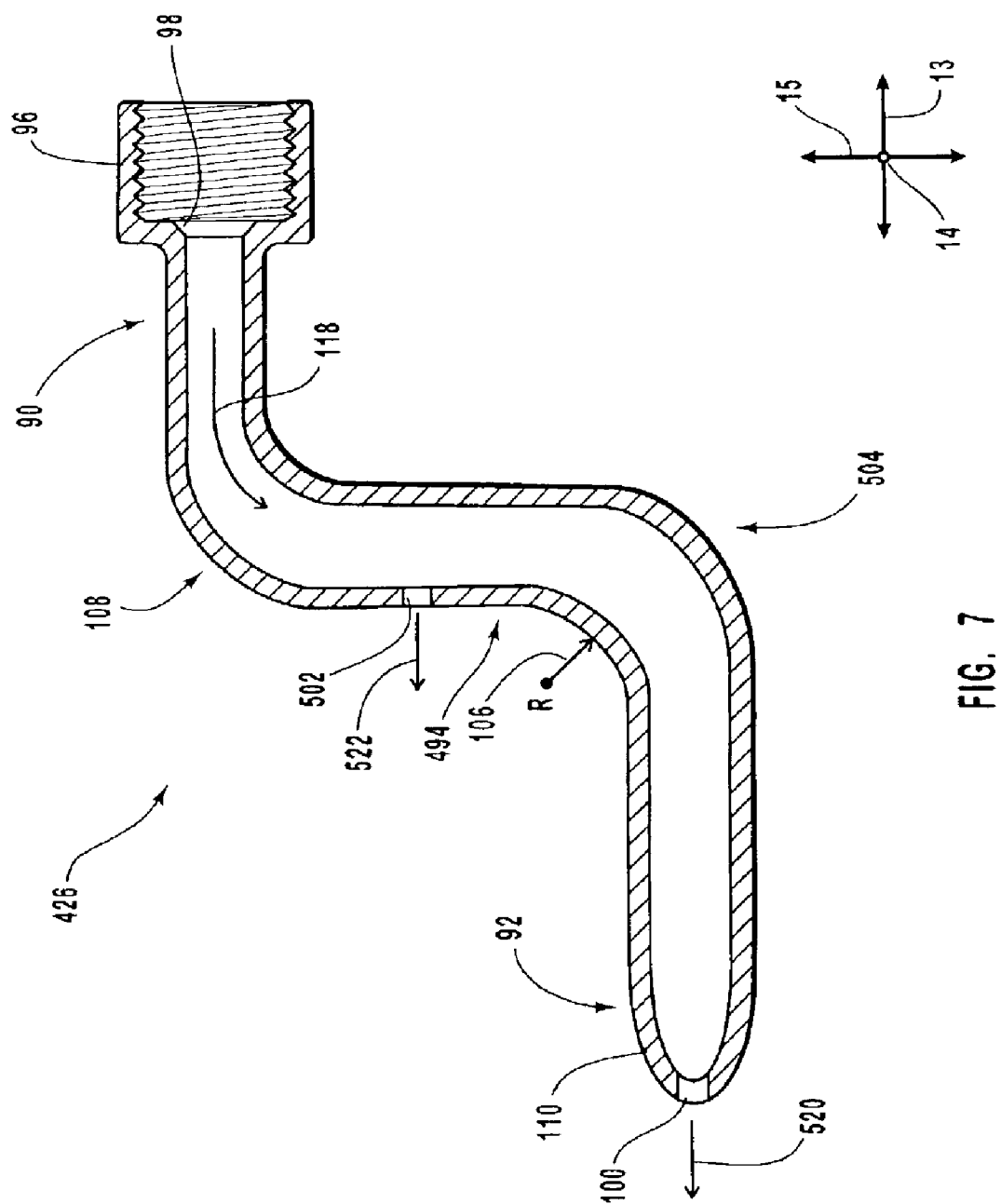
FIG. 7 is a side elevation, section view of a gas guide according to yet another alternative embodiment of the invention.

Referring to FIG. 7, a side elevation, section view depicts a gas guide 426 according to yet another alternative embodiment of the invention. Like the gas guides 26, 126, 226, 326 of the previous embodiments, the gas guide 426 has a first end 90, a second end 92, and an intermediate portion 494 extending from the first end 90 to the second end 92.

The first and second ends 90, 92 are like those of the gas guide 26 of FIG. 3. The intermediate portion 494 is somewhat similar to the intermediate portion 194 of FIG. 4. However, the intermediate portion 494 has an intermediate opening 502 disposed adjacent to the inward side of a first small-radius bend 504. The second end 92 has a narrowed portion 110 that creates back pressure within the intermediate portion 494.

Hence, inflation gas from the inflator, depicted by the arrow 118, enters the gas guide 426 via the first opening 98. A first portion of the inflation gas, represented by an arrow 520, exits the second end 92 via the second opening 100. A second portion of the inflation gas, represented by the an arrow 522, exits the intermediate portion 494 via the intermediate opening 502. The second portion exits in substantially the same direction as the first portion. Thus, the arrows 520, 522 are parallel in the illustration of FIG. 7.

Such a configuration may be particularly useful for injecting inflation gas streams in the same direction into two adjacent segments of a cushion. For example, such a configuration may be desirable for inflatable curtains or overhead airbags. Some airbags may incorporate two or more fabric inflation channels through which inflation gas is received. A gas guide like the gas guide 426 of FIG. 7 may be used to inject inflation gas directly into those channels. If desired, the gas guide 426 may also have a tubular protrusion (not shown) that extends the intermediate opening 502 in the longitudinal direction 13 toward or beyond the longitudinal position of the second opening 100.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A gas guide for conveying inflation gas from an inflator into a cushion of an airbag module for protecting an occupant of a vehicle from impact, the gas guide comprising:

a first end configured to receive the inflation gas from the inflator;

a second end configured to release a first portion of the inflation gas into the cushion; and an intermediate portion between the first and second ends, the intermediate portion having a small-radius bend and an intermediate opening configured to release a second portion of the inflation gas into the cushion, wherein thrusts produced by the first portion and the second portion of the inflation gas are mutually negating;

wherein the intermediate portion is formed integrally with the first and second ends.

2. The gas guide of claim 1, wherein the small-radius bend is a substantially perpendicular bend.

3. The gas guide of claim 2, wherein the intermediate opening is disposed proximate the substantially perpendicular bend so that the first portion exits the second end along a first direction and the second portion exits the intermediate opening along a second direction generally opposite to the first direction.

4. The gas guide of claim 1, wherein the first end comprises a first opening and second end comprises a second opening with a cross sectional area smaller than a cross sectional area of the intermediate portion such that back pressure is created within the intermediate portion to induce the second portion to be released through intermediate opening.

5. The gas guide of claim 1, wherein the first end, the second end, and the intermediate portion are constructed of a material selected from the group consisting of metals, plastics, and composite materials.

6. An inflation assembly for inflating a cushion of an airbag module for protecting an occupant of a vehicle from impact, the inflation assembly comprising:

an inflator configured to release inflation gas; and a gas guide comprising a first end configured to receive the inflation gas from the inflator through a first opening, a second end configured to release a first portion of the inflation gas through a second opening, and an intermediate portion between the first and second ends, the intermediate portion having a small-radius bend and an intermediate opening, wherein the second opening has a cross sectional area smaller than a cross sectional area of the intermediate portion such that back pressure is created within the intermediate portion to induce a second portion of the inflation gas to be released through the intermediate opening, wherein the first portion exits the second opening along a first direction and the second portion exits the intermediate opening along a second direction generally opposite to the first direction.

7. The inflation assembly of claim 6, wherein the second opening has a cross sectional area smaller than a cross sectional area of the intermediate opening.

8. The inflation assembly of claim 6, wherein the cross sectional area of the second opening is approximately 40% of the cross sectional area of the intermediate portion.

9. The inflation assembly of claim 6, wherein the small-radius bend is a substantially perpendicular bend.

10. The inflation assembly of claim 9, wherein the intermediate opening is disposed proximate the substantially perpendicular bend.

11. An airbag module for protecting an occupant of a vehicle from impact, the airbag module comprising:
a cushion;
an inflator configured to release inflation gas; and
a gas guide comprising a tube having a first end configured to receive the inflation gas from the inflator, a second end configured to release a first portion of the inflation gas into the cushion, and an intermediate portion between the first and second ends, the intermediate portion having a first small-radius bend out of the cushion and a second small-radius bend within the cushion and an intermediate opening configured to release a second portion of the inflation gas into the cushion, wherein the intermediate portion is formed integrally with the first and second ends.

12. The airbag module of claim 11, wherein the first small-radius bend is a substantially perpendicular bend.

13. The airbag module of claim 12, wherein the intermediate opening is disposed such that the first portion exits the second end along a first direction and the second portion also exits the intermediate opening along the first direction.

14. The airbag module of claim 12, wherein the intermediate opening is disposed proximate the substantially perpendicular bend so that the first portion exits the second end along a first direction and the second portion exits the intermediate opening along a second direction generally opposite to the first direction.

15. The airbag module of claim 12, wherein the first portion exits the second end along a first direction and the second portion exits the intermediate opening along a second direction, wherein the second direction is within thirty degrees of being exactly opposite to the first direction.

16. The airbag module of claim 11, wherein the first end comprises a first opening and the second end comprises a second opening with a cross sectional area smaller than a cross sectional area of the intermediate portion such that back pressure is created within the intermediate portion to induce the second portion to be released through the intermediate opening.

17. The airbag module of claim 16, wherein the second end is integrally formed, the second end comprising a narrowed portion that terminates in the second opening.

18. The airbag module of claim 16, wherein the second end comprises a cap in which the second opening is formed.

19. The airbag module of claim 11, wherein the intermediate opening comprises a punched hole configured to operate substantially independently of any obstruction within the intermediate portion.

20. The airbag module of claim 11, wherein the intermediate portion comprises a deflector configured to separate the first portion from the second portion and to direct the second portion through the intermediate opening.

21. The airbag module of claim 20, wherein the second opening has a cross sectional area smaller than a cross sectional area of the intermediate portion such that back pressure is created within the intermediate portion to expedite gas release through the intermediate opening.

22. The airbag module of claim 11, wherein the cushion comprises a first panel and a second panel, wherein the second end is positioned to direct the first portion into the first panel and the intermediate opening is positioned to direct the second portion into the second panel.

23. The airbag module of claim 22, wherein the cushion is an inflatable curtain comprising an upper end configured to be attached to the vehicle and a lower end configured to inflate downward from the upper end, wherein the upper end comprises a gas guide opening through which the intermediate portion extends such that the first end is disposed outside the cushion and the small-radius bend and the second end are disposed inside the cushion.

24. The airbag module of claim 11, wherein the gas guide is constructed of metal.

25. A method for inflating a cushion of an airbag module for protecting an occupant of a vehicle from impact, the airbag module comprising an inflator and a gas guide having a first end, a second end, and an intermediate portion between the first and second ends, the method comprising:
releasing inflation gas from the inflator in response to detection of a collision of the vehicle;
conveying the inflation gas into the first end;
releasing a first portion of the inflation gas from the second end at a flow rate selected to create back pressure within the intermediate portion; and
urging a second portion of the inflation gas to exit the intermediate portion through an intermediate opening disposed in the intermediate portion, proximate a small-radius bend of the intermediate portion, via the back pressure, wherein the second portion of the inflation gas exits the intermediate portion along a direction generally opposite to a direction along which the first portion exits the second end.

26. The method of claim 25, wherein releasing the first portion from the second end at a flow rate selected to create back pressure comprises moving the first portion through a cross sectional area smaller than a cross sectional area of the intermediate portion.

27. The method of claim 25, wherein intermediate portion further comprises a deflector, wherein urging the second portion of the inflation gas to exit the intermediate opening comprises utilizing the deflector to separate the first and second portions from each other and directing the second portion through the intermediate opening.

28. The method of claim 25, wherein releasing the first portion from the second end at a flow rate selected to create back pressure comprises moving the first portion through a cross sectional area about 40% of the cross sectional area of intermediate portion.

29. The method of claim 25, wherein the small-radius bend is a substantially perpendicular bend, the method further comprising conveying the inflation gas through the substantially perpendicular bend.

30. The method of claim 29, wherein the intermediate opening is disposed on the substantially perpendicular bend.

31. A method for manufacturing a gas guide for conveying inflation gas from an inflator into a cushion of an airbag module for protecting an occupant of a vehicle from impact, the method comprising:
- providing a metal tube having a first end, a second end, and an intermediate portion, the intermediate portion having a cross sectional area;
- bending the metal tube to form a small-radius bend in the intermediate portion;
- forming an intermediate opening in the intermediate portion; and
- providing a second opening in communication with the second end, the second opening having a cross sectional area smaller than the cross sectional area of the intermediate portion, wherein thrusts produced by the first portion and the second portion of the inflation gas are mutually negating.

32. The method of claim 31, wherein bending the metal tube comprises forming a substantially perpendicular bend in the metal tube.

33. The method of claim 31, wherein forming the intermediate opening in the intermediate portion comprises punching out a section of the intermediate portion to form the intermediate opening.

34. The method of claim 31, wherein forming the intermediate opening comprises bending a section of the intermediate portion inward to create a deflector shaped to direct gas flowing through the intermediate portion through the intermediate opening.

35. The method of claim 31, wherein forming the intermediate opening comprises making the intermediate opening substantially parallel to the second opening so that inflation gas within the gas guide tends to exit the second opening in a first direction and exit the intermediate opening in a second direction generally opposite to the first direction.

36. The method of claim 31, wherein providing the second opening comprises rolling the second end to decrease a diameter of the second end proximate the second opening.

37. The method of claim 31, wherein providing the second opening comprises attaching a cap to the second end, wherein the second opening is formed in the cap.

* * * * *